US008157996B2

(12) United States Patent
Maloum et al.

(10) Patent No.: US 8,157,996 B2
(45) Date of Patent: Apr. 17, 2012

(54) WATER TREATMENT DEVICE COMPRISING A REACTOR AND MEANS FOR INJECTING A REAGENT INTO THE REACTOR MOUNTED ON MOBILE SUPPORTING MEANS

(75) Inventors: Abderrahmane Maloum, Bures sur Yvette (FR); Abdelkader Gaid, Paris (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 686 days.

(21) Appl. No.: 12/300,908

(22) PCT Filed: May 14, 2007

(86) PCT No.: PCT/EP2007/054655
§ 371 (c)(1),
(2), (4) Date: Dec. 11, 2008

(87) PCT Pub. No.: WO2007/135013
PCT Pub. Date: Nov. 29, 2007

(65) Prior Publication Data
US 2009/0236290 A1 Sep. 24, 2009

(30) Foreign Application Priority Data

May 19, 2006 (FR) ...................................... 06 04528

(51) Int. Cl.
*C02F 1/58* (2006.01)
*C02F 5/02* (2006.01)

(52) U.S. Cl. ...................... 210/205; 210/221.2; 210/237; 210/241; 261/124; 261/DIG. 47; 422/140; 422/231; 422/241

(58) Field of Classification Search ................... 210/205
See application file for complete search history.

(56) References Cited

U.S. PATENT DOCUMENTS

| 2,328,655 | A | * | 9/1943 | Lannert ...................... 261/122.1 |
| 3,574,331 | A | * | 4/1971 | Kurosawa et al. .......... 210/195.1 |
| 3,622,132 | A | * | 11/1971 | Rawlings, Jr. ................ 261/124 |
| 3,785,629 | A | * | 1/1974 | McKinney .................. 261/122.1 |
| 5,716,519 | A | * | 2/1998 | Schleife et al. ............... 210/206 |
| 6,200,472 | B1 | * | 3/2001 | Donald et al. ............. 210/195.1 |
| 6,863,810 | B2 | * | 3/2005 | Chann ......................... 210/220 |
| 8,043,501 | B2 | * | 10/2011 | Maloum et al. .............. 210/205 |

FOREIGN PATENT DOCUMENTS

| EP | 0348339 A | 12/1989 |
| FR | 2809331 A1 | 11/2001 |
| FR | 2874376 A | 2/2006 |

* cited by examiner

*Primary Examiner* — Peter A Hruskoci
(74) *Attorney, Agent, or Firm* — Coats & Bennett, P.L.L.C.

(57) ABSTRACT

The invention concerns a water treatment device comprising a reactor (1) and means for injecting (2) at least one reagent into said reactor, characterized in that it comprises means for supporting said injection means mobile relative to said reactor (1) between an active position whereby the injecting means (2) are arranged inside said reactor and a retracted position whereby the injecting means (2) are brought outside said reactor.

8 Claims, 1 Drawing Sheet

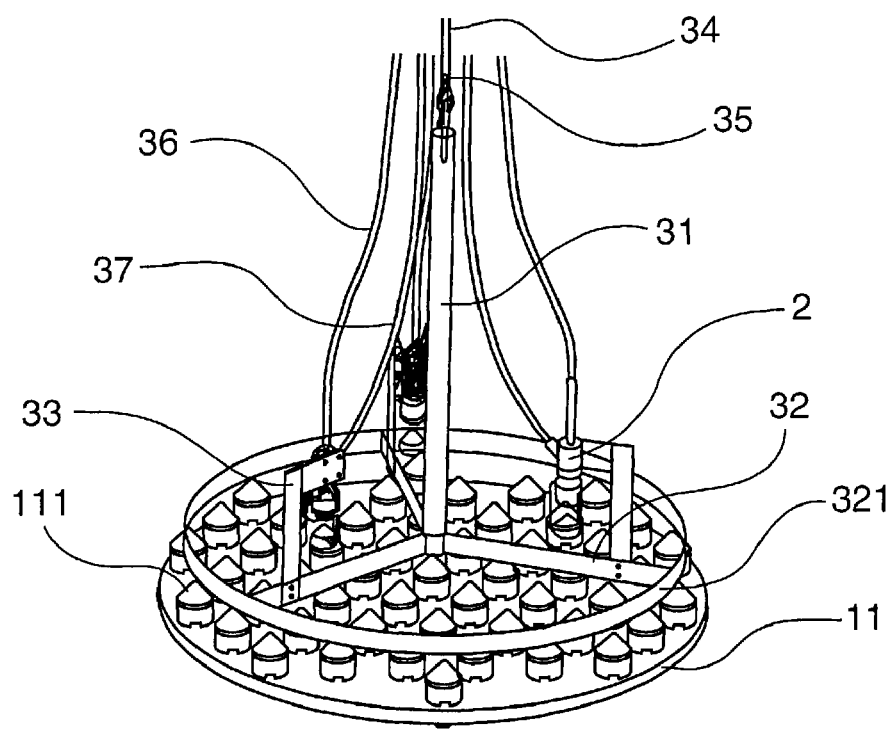
Fig. 1
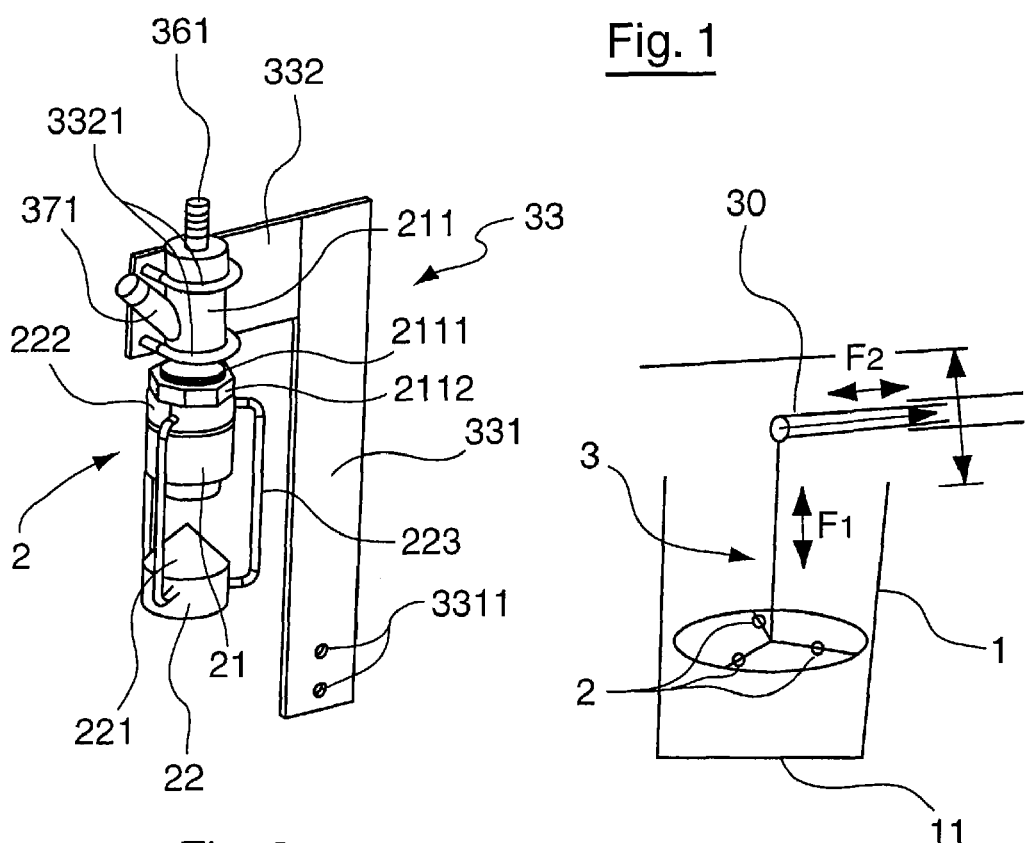
Fig. 2
Fig. 3

WATER TREATMENT DEVICE COMPRISING A REACTOR AND MEANS FOR INJECTING A REAGENT INTO THE REACTOR MOUNTED ON MOBILE SUPPORTING MEANS

This application is a U.S. National Stage application of PCT Application No. PCT/EP2007/054655, with an international filing date of May 14, 2007. Applicant claims priority based on French application serial no. 0604528 filed May 19, 2006, and is incorporated herein by reference in its entirety.

The field of the invention is that of water treatment. More precisely, the invention relates to techniques for softening water, particularly drinking water, as well as techniques for treating water by a decarbonation.

In the field of the invention, it is known to proceed to water decarbonation by removing calcium carbonate ($CaCO_3$) and magnesia ($Mg(OH)_2$) either by exchanging ions with a sodium resin, or by adding to the water to be treated a basic reagent causing a precipitation of the carbonates and the magnesia which must then be filtered. The reactions involved, either with sodium hydroxide, or with hydrated lime are as follows:

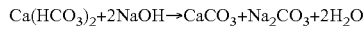

$Ca(HCO_3)_2 + 2NaOH \rightarrow CaCO_3 + Na_2CO_3 + 2H_2O$

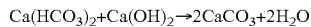

$Ca(HCO_3)_2 + Ca(OH)_2 \rightarrow 2CaCO_3 + 2H_2O$

What is sought is therefore to have a drop of water hardness, i.e its total hardness (TH) which is often very high and can reach more than 50 degrees, so as to lower such TH to values advantageously between 8 and 15°, as recommended, for example, by the Conseil Supérieur d'Hygiène Publique de France (CS HPF).

According to a solution implemented in the industry, drinking water decarbonation for example, consists in incorporating in the treatment station a reactor wherein raw water is injected at its bottom portion and is treated with an alkaline agent of the above mentioned type inside a fine granular material used as a crystallisation seed to form calcium carbonate beads, and is maintained in fluidisation in the liquid mass.

Reactors for implementing such processes have been suggested in the prior art.

A well-known reactor of the prior art comprises, on one hand, in its lower portion, a series of flat injectors made of two perforated grids each comprising a face with triangular teeth and disposed in a head-to-foot fashion, through which water is injected and, on the other hand, in its upper portion, with an extension comprising a series of sloped blades forming an angle of 55 to 65 degrees with the vertical axis of the reactor. The alkaline agent is introduced through the injectors provided just above the floor with a staged distribution in the upright direction of the reactor.

The injectors for diffusing the alkaline agent are incorporated in the reactor walls.

However, with this type of reactor, a calcium carbonate deposit is quite readily noticed on the alkaline agent injectors, which eventually will lead to an obstruction of the injectors.

It is then required to maintain the reactor, particularly in order to remove the obstruction in the injectors, or even to replace the injectors.

In practice, the calcium carbonate deposit is materialised as large blocks on the injectors.

These large blocks are manually removed from the injectors with a hammer and a burin. Of course, on all the injectors, such operation is long and tedious.

In order to access the injectors, the reactor is completely drained and washed, generally by an acid treatment.

In addition, calcium carbonate beads which were formed in the fine material serving as the crystallisation seed should be retrieved.

These interventions are very long in practice and therefore lead to large operating losses: when cumulated, the non-operating periods can reach 6 months within a year.

In addition, the reactor draining requires the arrest of the current seeding process. The reactor thus has to be inoculated after each draining, which considerably increases the length of the non-operating periods.

The invention applies particularly to water decarbonation devices but also more generally to any water treatment device comprising a reactor and injectors of a reactant inside a reactor for which maintenance operations of the injectors must be periodically carried out.

The particular purpose of the invention is to overcome this prior art drawbacks.

More precisely, a purpose of the invention is to provide a water treatment equipment allowing considerable operation gains, particularly by drastically reducing the non-operating periods due to maintenance operations of the injection means of a reactant inside the reactor.

Another purpose of the invention is to provide such an equipment which avoids the necessity of draining the reactor and thus avoids the inoculation of the reactor after each maintenance operation.

A further purpose of the invention is to provide such an equipment which facilitates maintenance operations, particularly by giving such operations a time flexibility greater than the known solutions.

Another purpose of the invention is to provide such an equipment which has a simple design and is readily implemented.

These purposes, as well as other purposes which will readily appear thereafter, are achieved with the invention, which is a water treatment device comprising a reactor and means for injecting at least one reagent into said reactor, characterised in that it comprises means for supporting said injection means, said supporting means being mobile relatively to said reactor between an active position whereby the injecting means are arranged inside said reactor and a retracted position whereby the injecting means are brought outside said reactor.

Such a device has numerous advantage in comparison to the prior art solutions, particularly in that:

- it is not necessary to drain the reactor in order to maintain the alkaline agent injection means;
- it is not necessary to interrupt the current seeding process and, thus, it is possible to avoid the required reactor inoculation step.

Thanks to the invention, the maintenance times, and particularly the reagent injection means maintenance times may be drastically reduced.

It is thus possible to consider serious operation gains.

In addition, maintenance operations may be carried out with a great time flexibility in comparison with the ones carried out with known techniques.

Indeed, in the past, the interventions were carried out most often in a hurry (and under generally uncomfortable conditions) to reduce as much as possible the reactor non-operating periods.

On the other hand, according to the invention, used injectors (or nozzles) may be repaired and/or maintained away from the reactor. The intervention then consists of removing from the reactor the nozzles requiring a maintenance and replacing them by an assembly ready-to-be-used comprising nozzles maintained in parallel (in masked time).

The personnel in charge of the maintenance may thus select the most appropriate moment to carry out the intervention and intervention times around the reactor are reduced.

According to a particular application, said reactor is a decarbonation reactor.

According to an advantageous solution, said supporting means comprise a tower for extending substantially correspondingly with the axis of said reactor, said tower carrying at least one radial extension on which said injection means are attached.

The structure thus obtained is of simple design and easy to implement.

According to a particular embodiment, said tower has at or near the base portion thereof three radial extensions.

Sufficient diffusion of the reagent inside said reactor may thus be achieved.

Advantageously, said radial extensions are connected by stiffening means, said stiffening means preferably comprising a strapping to which said extensions are connected.

Thus, the supporting means are sufficiently reinforced, which allows risks of the structure degradation (even rupture) due to large variations induced by the flow of water and possibly the granulated material (in the case of decarbonation device) to be limited.

In addition, the strapping stiffening means allow the supporting means to be centred in the (cylindrical) reactor, which reduces the probability for the structure to bend when it goes up or down in the reactor.

Advantageously, each of said extensions has a jib crane on which said injection means are mounted.

Means thus achieved are less expensive, easy to manufacture and to mount on the extensions.

According to an advantageous solution, said tower is connected by the upper end thereof to a hoisting sling, said tower and said sling being preferably removably coupled.

Such a feature contributes to the device simplicity and easy implementation.

In addition, the removable coupling gives way to very fast interventions: the assembly formed by the tower, the extensions and the injection means carried by the extensions may be replaced rapidly by a similar, previously prepared assembly.

According to a preferred solution, said supporting means are combined with hoisting means provided for moving said supporting means between said retracted position above said reactor and a disengaging position on said reactor side.

In this case, said hoisting means preferably comprise a telescopic arm extending substantially horizontally.

Advantageously, feeding means for said injection means extend along said supporting means.

Thus, the feeding means may easily run inside the reactor, and withdrawing the supporting means in a retracted position will also lead to the withdrawal of the feeding means, which ensures an optimal access inside the reactor if necessary.

Advantageously, the reactor comprises a floor on which a plurality of nozzles for introducing the water to be treated are provided.

According to an advantageous solution, the reactor comprises a floor made of transparent, stiff and reinforced PVC material.

Such a floor has a very good resistance to erosion due to the granulated material. Besides, such a floor does not retain carbon, which leads to an auto-cleaning phenomenon thanks to water flowing inside the reactor.

According to another feature of the invention, said means for injecting a reagent comprise at least one nozzle for injecting a jet of said reagent, said nozzle being combined with a member for dispersing said jet.

The injectors of the prior art are generally provided with an output diameter of about 8 mm.

However, particularly in the case of decarbonation devices, it has been noticed that as the output diameter increases, the calcium carbonate deposition on the injectors increases as well, leading, as mentioned above, to the obstruction of the injectors, requiring the above mentioned interventions.

It is thus desirable to reduce as much as possible the output diameter of the injectors.

However, reducing the output diameter also reduces the capacity of the injectors to have a large reacted diffusion range, which prejudices the reaction and in accordance the reactor efficiency.

The feature according which the injection means are associated with dispersion means advantageously allows the injection means output diameter to be reduced and thus the reactant deposition thereon to be also reduced, while ensuring a satisfying diffusion of the reactant in the reactor.

Such a feature indicatively allows effective injection means to be provided with an output diameter of about 4 mm (as opposed to 8 mm according to the prior art).

According to an advantageous solution, said member is positioned facing said nozzle and has a dispersion surface extending over 360°.

Preferentially, said member has a cone shape which top portion is to be centred relatively to said jet.

"A back-nozzle", which is particularly effective and readily manufacturable, is thus achieved.

According to an advantageous solution, the device comprises means for adjusting the distance between said nozzle and said member.

The distance between the injection means and the member associated therewith may also be adjusted, in order to ensure a satisfying dispersion of the alkaline agent, particularly according to the flow rate thereof.

In this case, said injection means are advantageously carried by a body having a threaded cylindrical portion, said member comprising a threaded ring for cooperating with said threaded cylindrical portion.

In this way, simple and effective means for adjusting the distance between the injection means and the member which is associated therewith are achieved, and said distance can be readily modified by rotating the dispersion member on the element carrying the injection means.

Preferably, said body carries a lock-nut mounted on said threaded cylindrical portion and to be tightened against said threaded ring.

According to an advantageous solution, said cone shape and said threaded ring are connected through a cutout cage wherein said nozzle is incorporated, said cage being preferably made of three branches distributed around said cone shape with an angle of about 120° therebetween.

Other features and advantages of the invention will readily appear in the following description of one preferable exemplary embodiment of the invention, given as an illustration and, not a limitation, and appended drawings in which:

FIG. 1 is a perspective view of the supporting the means of means for injecting an alkaline agent of a decarbonation device according to the invention;

FIG. 2 is a perspective view of a preferable embodiment of the means for injecting an alkaline agent in a decarbonation device according to the invention;

FIG. 3 is a schematic drawing of the decarbonation device according to the invention.

As previously indicated, the principle of the invention lies in the combination, in a water treatment device, of a reactor with means for injecting a reagent carried by supporting means which are mobile relatively to the reactor so that the injection means may be withdrawn from the reactor without having to drain the reactor.

The following description refers to an application of the invention to a water decarbonation device.

The principle of the invention is schematically illustrated in FIG. 3 showing a decarbonation reactor 1 in which raw water to be treated is injected at the floor portion 11, the water being treated with an alkaline agent inside a fine granulated material (for example sand).

The alkaline agent is injected by injectors 2 carried by a vertically mobile carrying structure 3 as symbolised by the arrow F1.

It is understood that with this carrying structure 3, the injectors 2 can be driven out of the reactor vessel in a retracted position, a maintenance operation can be carried out thereon (and/or inside the reactor), and then the injectors can be brought back inside the reactor in an active position.

Preferably, the carrying structure 3 is mounted on a horizontal telescopic arm 30 allowing the carrying structure 3, driven in a retracted position, to be horizontally moved as symbolised by the arrow F2. The carrying structure may thus be brought in a disengaging position, on the reactor side.

It is noteworthy that means for vertically and maybe horizontally moving the carrying structure may be incorporated in a relatively reduced height space, extending, for example, between the top end of the reactor and a building ceiling in which the reactor is installed.

According to a preferred solution illustrated in FIG. 1, the carrying structure comprises a tower 31 for extending inside the reactor coincidentally with the vertical axis thereof, the tower 31 having at its lower end radial extensions 32 on which the injectors are attached, as will be explained in detail thereafter.

According to this embodiment, the tower 31 has three radial extensions 32 which form in pairs an angle of 120°, a strapping 321 being secured at the ends of the extensions 32 to form a rapid assembly.

The strapping 321 is secured to the extensions, for example, by a weld.

At its top end, the tower 31 is coupled to a hoisting sling 34 passing through a mounted pulley and the end of the above mentioned telescopic arm, and connected to a remote hoisting winch.

Advantageously, the sling 34 is removably coupled to the tower 31, for example through a shackle 35.

In addition, feeding ducts for the injectors 2 extend along the carrying structure. In this case, two flexible feeding ducts are provided for each injector 2, one being for feeding sodium, the other being for feeding softened water.

FIG. 1 shows a carrying structure as just described, in an active position, that is near the floor 11 of the reactor.

It is noteworthy that the floor 11 has a plurality of introduction means in the reactor of water to be treated, such introduction means being designed as a strainer 111.

It is also noteworthy that the floor 11 is advantageously made from a clear, stiff, reinforced PVC material, such as the material known as TRICOCLAIR (registered trade mark).

Besides, the injectors 2 are mounted to the radial extensions 32 through jib cranes 33 the description thereof referring to FIG. 2.

As can be seen in FIG. 2, the jib cranes 33 are carried out by assembling metal plates 331, 332, for example by welding (the jib cranes may also be made as a single piece) and are provided so as to have the injectors 2 above the extensions 32.

The plate 331 provides the jib crane post and has in its bottom portion holes 3311 through which attachment means of the jib crane on an extension, for example by bolting, can pass.

The plate 332 is in turn designed for carrying an injector 2.

In this purpose, the body 211 of the injector 2 carrying the nozzle 21 is attached to the plate 332 through two flanges 3321 bolted to the plate.

It is noteworthy that the body 211 has two connecting end pieces 361, 371 respectively connected to the sodium duct 37 and to the softened water duct 36 mentioned above, the end piece 361 extending in the axial direction of the body 211 and the end piece 371 laterally extending from the body 221.

In such a configuration, the flanges 3321 are advantageously provided on either side of the end piece 371.

According to another embodiment of the invention, the nozzle 21 is combined with a dispersion member 22 for providing the dispersion of the alkaline agent jet from the nozzle 21.

According to this embodiment, the member 22 has a cone shape 221, which top portion is directed towards and centred relatively to the nozzle, such cone shape 221 providing a dispersion surface extending over 360° and allowing the jet to be turned into an umbrella shape.

In addition, this member is mounted with an adjustable height relatively to the nozzle 21, in order to adjust the distance between the top portion of the cone shape and the outlet of the nozzle 21, which allows the alkaline agent dispersion to be optimised.

The top portion of the cone shape is indicatively positioned at a distance of about 15 to 20 mm from the nozzle outlet.

In this purpose, the member 22 comprises a threaded ring 222 mounted on a threaded portion 2111 of the body 211. It is understood that a rotation of the threaded ring on the threaded portion 2111 leads to a vertical translation of the member 22 relatively to the body 211 and therefore a variation of the distance between the top portion of the cone shape 221 and the nozzle 21 (which is in turn attached to the body 211).

A locknut 2112 is provided on the threaded portion 2111 to ensure that the member 22 is maintained in a vertical position, being tightly clamped against the threaded ring 222 of the member 22.

As can be seen in FIG. 2, the cone shape 221 is connected to the threaded ring 222 through three branches 223 distributed at 120° and together defining a cutout cage in which the nozzle 21 is incorporated.

The invention claimed is:

1. A water treatment system for treating water containing minerals, comprising:
   a reactor for treating and holding water, the reactor including at least one inlet for directing water into the reactor;
   a means for injecting a reagent into the reactor, the means for injecting the reagent comprising:
   a supporting means having a plurality of radial arms operatively connected to a plurality of nozzles;
   a plurality of reagent feed lines operatively connected to the plurality of nozzles for feeding reagents to the plurality of nozzles, the plurality of reagent feed lines being separate from the plurality of radial arms;
   a carrying structure for moving the supporting means between a retracted position and an active position; wherein in the active position the supporting means is disposed within the reactor and in the retracted position the supporting means is disposed outside of the reactor; and the plurality of nozzles operable for injecting reagents into the reactor such that the reagents treat the water in the reactor.

2. The water treatment system of claim 1 wherein the supporting means includes:
   a circular rim extending around a central space and the plurality of radial arms extends inwardly from the circular rim to the central space;
   a tower extending upwardly from the plurality of radial arms, the tower having a proximal end and a distal end; and
   wherein the plurality of radial arms is operatively connected to the proximal end of the tower and the carrying structure is removably coupled to a distal end of the tower.

3. The water treatment system of claim 2 further comprising a telescopic arm operatively connected to the carrying structure for moving the means for injecting the reagent from a position directly above the reactor to a position laterally adjacent to the reactor when the supporting means is in the retracted position, the telescopic arm extending generally transverse to the tower.

4. The water treatment system of claim 2 wherein each radial arm is spaced within the central space such that each radial arm forms an approximately 120° angle with one of the other radial arms.

5. The water treatment system of claim 1 wherein the reactor includes a base comprising a reinforced PVC material such that the base is resistant to erosion.

6. The water treatment system of claim 1 wherein the reactor includes a base and a plurality of inlets extending through the base for directing water into the reactor.

7. The water treatment system of claim 1 wherein the supporting means includes:
   a circular rim extending around a central space and the plurality of radial arms extends inwardly from the circular rim to the central space;
   a tower extending upwardly from the plurality of radial arms, the tower having a proximal end and a distal end;
   wherein the plurality of radial arms is operatively connected to the proximal end of the tower and the carrying structure is removably coupled to a distal end of the tower; and
   wherein each radial arm is spaced within the central space such that each radial arm forms an approximately 120° angle with one of the other radial arms.

8. The water treatment system of claim 1 further comprising:
   a telescopic arm operatively connected to the carrying structure for moving the means for injecting the reagent from a position directly above the reactor to a position laterally adjacent to the reactor when the supporting means is in the retracted position, the telescopic arm extending generally transverse to the carrying structure;
   the reactor having a base comprising a reinforced PVC material so that the base is resistant to erosion; and
   a plurality of inlets extending through the base for directing water into the reactor.

* * * * *